United States Patent
Muratsu et al.

(10) Patent No.: US 10,930,907 B2
(45) Date of Patent: Feb. 23, 2021

(54) BATTERY MODULE

(71) Applicant: Panasonic Intellectual Property Management Co., Ltd., Osaka (JP)

(72) Inventors: Jiro Muratsu, Osaka (JP); Chifumi Murayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 10 days.

(21) Appl. No.: 16/483,687

(22) PCT Filed: Feb. 6, 2018

(86) PCT No.: PCT/JP2018/003934
§ 371 (c)(1),
(2) Date: Aug. 5, 2019

(87) PCT Pub. No.: WO2018/155158
PCT Pub. Date: Aug. 30, 2018

(65) Prior Publication Data
US 2020/0028132 A1    Jan. 23, 2020

(30) Foreign Application Priority Data
Feb. 23, 2017 (JP) .............................. JP2017-031724

(51) Int. Cl.
*H01M 2/10* (2006.01)
*H01M 2/04* (2006.01)
(Continued)

(52) U.S. Cl.
CPC ......... *H01M 2/1077* (2013.01); *H01M 2/046* (2013.01); *H01M 2/206* (2013.01); *H01M 2/305* (2013.01)

(58) Field of Classification Search
CPC combination set(s) only.
See application file for complete search history.

(56) References Cited

U.S. PATENT DOCUMENTS

| 9,490,465 B2* | 11/2016 | Jan ........................ H01M 2/206 |
| 2017/0005316 A1* | 1/2017 | Harris ................. H01M 2/1077 |

FOREIGN PATENT DOCUMENTS

JP    2016-207569    12/2016

OTHER PUBLICATIONS

International Search Report of PCT application No. PCT/JP2018/003934 dated Mar. 6, 2018.

* cited by examiner

*Primary Examiner* — Amanda J Barrow
(74) *Attorney, Agent, or Firm* — McDermott Will & Emery LLP

(57) ABSTRACT

A battery module includes a plurality of cylindrical batteries, a wiring board, a plurality of positive electrode-side current collector members, and a plurality of negative electrode-side current collector members. The wiring board is a wiring board having a multilayer structure in which wiring patterns are formed in a plurality of layers, and includes a positive electrode-side wiring pattern and a negative electrode-side wiring pattern. The respective wiring patterns are formed as different layers of the wiring board. Each positive electrode-side current collector member electrically connects a sealing body functioning as a positive electrode external terminal of each cylindrical battery and the positive electrode-side wiring pattern. Each negative electrode-side current collector member electrically connects a case body functioning as a negative electrode external terminal of each cylindrical battery and the negative electrode-side wiring pattern.

8 Claims, 11 Drawing Sheets

(51) Int. Cl.
*H01M 2/30* (2006.01)
*H01M 2/20* (2006.01)

BATTERY MODULE

TECHNICAL FIELD

The present disclosure relates to a battery module.

BACKGROUND ART

Conventionally, in a battery module particularly used for a vehicle such as an electric motor car or a hybrid vehicle, an electric tool, a power storage system, or the like, a number of batteries are connected to realize high capacity and high power. For example, Patent Literature 1 discloses a battery module in which a current collector member is connected to each of a positive electrode and a negative electrode of a cylindrical battery, and a plurality of cylindrical batteries are connected in parallel.

CITATION LIST

Patent Literature

PTL 1: Unexamined Japanese Patent Publication No. 2016-207569

SUMMARY OF THE INVENTION

Current collector members of the positive electrode side and the negative electrode side, to be attached to each cylindrical battery, are individually welded to one end surface and the other end surface in an axial direction of the cylindrical battery, in general. Therefore, in a conventional battery module, it is necessary to provide current collector members, insulation members, and other members on axially both sides of each cylindrical battery.

A battery module according to one aspect of the present disclosure is a battery module having a plurality of cylindrical batteries. Each of the cylindrical batteries has a battery case including a case body and a sealing body. The case body has a bottomed cylindrical shape and contains a power generation element. The sealing body seals an opening of the case body. The cylindrical batteries are disposed in a state where the sealing bodies face in a same direction. The battery module is characterized as to include a wiring board provided to a side of the sealing body so as to cover the cylindrical batteries, the wiring board having wiring patterns in a plurality of layers; a plurality of first current collector members electrically connected to the sealing bodies, respectively, the sealing bodies functioning as first external terminals of the cylindrical batteries; a plurality of second current collector members electrically connected to the case bodies, respectively, the case bodies functioning as second external terminals of the cylindrical batteries; a one-side wiring pattern of the wiring board, the one-side wiring pattern electrically connecting the first current collector members to each other; and an other-side wiring pattern of the wiring board, the other-side wiring pattern electrically connecting the second current collector members to each other. The one-side wiring pattern and the other-side wiring pattern are provided on different layers of the wiring board.

In the battery module that is one aspect of the present disclosure, it is preferable that each of the second current collector members is a ring-shaped member including an engagement claw that engages with a recess formed on the case body, and a connecting board to be joined to the other-side wiring pattern. It is also preferable that each of the first current collector members is a member that is elastically deformable in an axial direction of the cylindrical battery, and in a state where the engagement claws of the second current collector members engage with the recesses of the cylindrical batteries, respectively, the first current collector members are urged or energized to the sealing bodies, respectively.

According to the battery module that is one aspect of the present disclosure, there is no need to provide current collector members, insulation members, and other members on both sides in the axial direction of the cylindrical battery. This enables an improvement in productivity, simplification of a structure, a reduction in material costs, an improvement in cooling performance of batteries, and the like.

Further, in a conventional battery module, a large number of welding workloads is needed at the time of mounting current collector members, and a loss due to defective welding is also likely to occur. However, by applying the ring-shaped member to the second current collector member and realizing a configuration in which the first current collector member is urged or energized to the sealing body, such a problem can be solved. According to the present configuration, as there is no need to perform welding between the current collector members and the battery cases, it is easy to recover the cylindrical batteries in disposal of the module.

DESCRIPTION OF EMBODIMENTS

Figure 1:
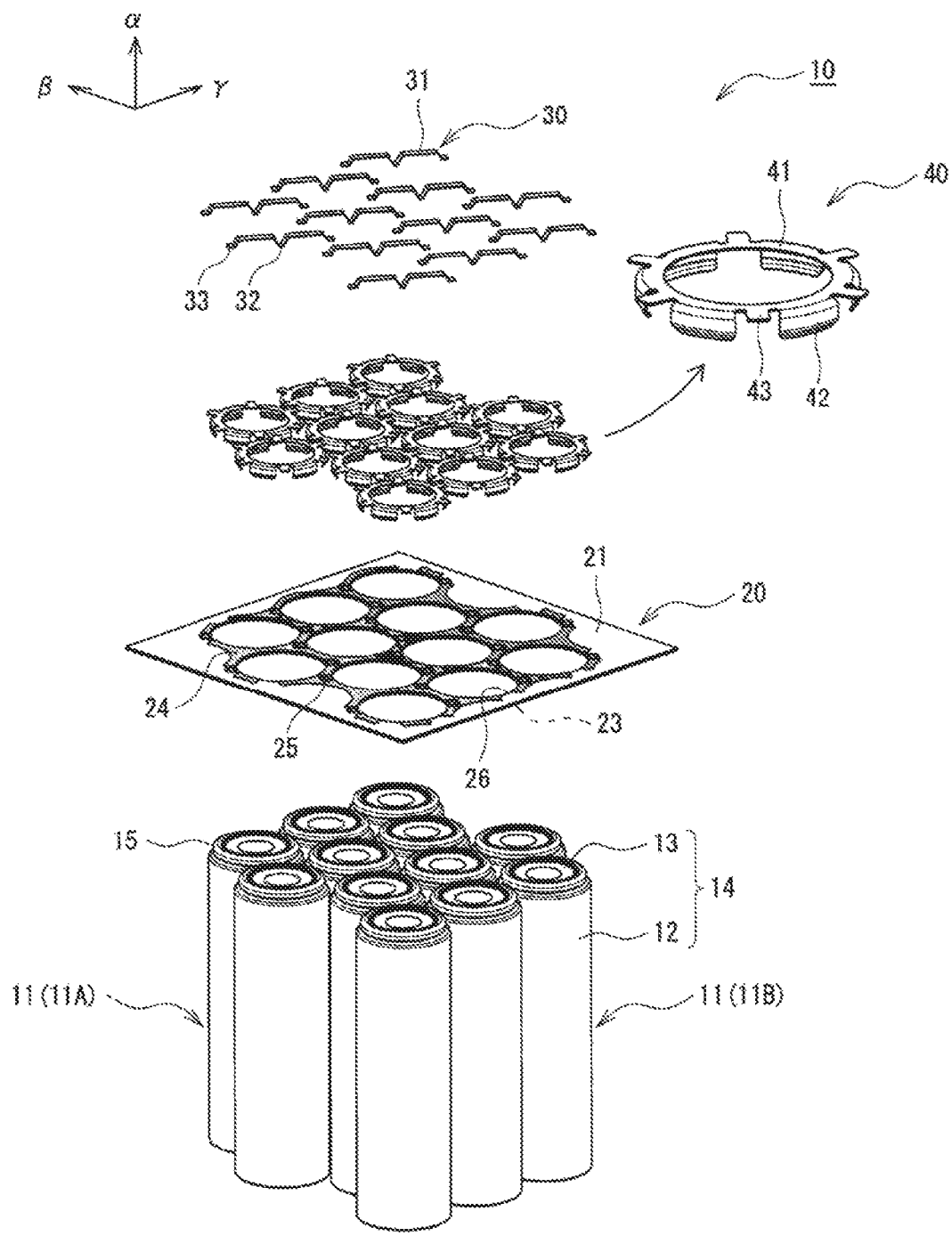
FIG. 1 is an exploded perspective view of a battery module according to a first exemplary embodiment.

An exemplary embodiment of the present disclosure will be described in detail below. Note that a battery module according to the present disclosure is not limited to the exemplary embodiment described below. Drawings referred to in a description of the exemplary embodiment are schematically drawn, and thus dimensions and proportions of configuration elements illustrated in the drawings should be understood in view of the following description.

In the below description, it is assumed that an axial direction of a cylindrical battery is an "up and down direction", and a sealing body side is "up". It is also assumed that two directions, orthogonal to each other, along a surface of a wiring board are a "front-back direction" and a "lateral direction". In FIG. 1 and other drawings, the up and down direction is indicated by an arrow α, the front-back direction is indicated by an arrow β, and the lateral direction is indicated by an arrow γ.

First Exemplary Embodiment

With reference to FIGS. 1 to 6, battery module 10 according to a first exemplary embodiment will be described below in detail.

FIG. 1 is an exploded perspective view of battery module 10. As shown in FIG. 1, battery module 10 includes a plurality of cylindrical batteries 11 each having battery case 14 configured of case body 12 in a bottomed cylindrical shape to contain a power generation element and sealing body 13 that seals an opening of case body 12. Cylindrical batteries 11 are disposed in a state where sealing bodies 13 face in a same direction. Battery module 10 has a module case not shown, for example, and cylindrical batteries 11 and the like are contained in the module case.

Battery module 10 includes a wiring board 20 provided on a side of sealing body 13 so as to cover cylindrical batteries 11, a plurality of positive electrode-side current collector members 30 (first current collector members) and a plurality of negative electrode-side current collector members 40 (second current collector members). Wiring board 20 is configured of a substrate having a multiple-layered structure in which wiring patterns are formed in multiple layers (multilayer wiring board). Positive electrode-side wiring pattern 23 (one-side wiring pattern) and negative electrode-side wiring pattern 24 (another-side wiring pattern) are formed in different layers. Wiring board 20 has a plurality of through holes 26 for exposing sealing bodies 13 of cylindrical batteries 11 respectively.

In battery module 10, by mounting one wiring board 20 on axially one side (upper side) of respective cylindrical batteries 11, it is possible to realize electrical connections on both the positive electrode side and the negative electrode side. Further, there is no need to perform welding on the respective current collector members and battery case 14. A configuration of battery module 10 for realizing such an excellent effect will be described below in detail.

It is preferable that cylindrical batteries 11 mounted on battery module 10 are connected in parallel to each other. Battery module 10 may have a plurality of parallel blocks formed of cylindrical batteries 11 connected in parallel. In the present exemplary embodiment, cylindrical batteries 11 are classified into a first parallel block A and a second parallel block B. The first parallel block A and the second parallel block B are connected in series. Note that the number of parallel blocks included in battery module 10 is not limited particularly. Further, the number of cylindrical batteries 11 constituting each parallel block is not limited particularly.

In the below description, it is assumed that each of six cylindrical batteries 11 constituting the first block A is referred to as "cylindrical battery 11A" and each of six cylindrical batteries 11 constituting the second parallel block B is referred to as "cylindrical battery 11B". It is assumed that batteries of a same type are used as cylindrical batteries 11A, 11B. Description will also be given based on the premise that positive electrode-side current collector member 30 and negative electrode-side current collector member 40 have a same shape and a same dimension.

Power generation elements constituting cylindrical battery 11 each include an electrode assembly having a winding structure in which a positive electrode and a negative electrode are wound via a separator, for example, and a non-aqueous electrolyte. One example of cylindrical battery 11 is a lithium ion battery. Battery case 14 is a metallic case configured of case body 12 and sealing body 13. A gasket is provided between case body 12 and sealing body 13, whereby sealing property inside battery case 14 is secured, and case body 12 and sealing body 13 are insulated.

Cylindrical battery 11 has groove 15 formed on case body 12. Groove 15 is a recess formed by pressing a side surface of case body 12 from an outside, for example, and is formed in an annular shape along a circumferential direction of case body 12. In case body 12, a portion in which groove 15 is formed may be projected inward. Sealing body 13 is placed on an upper surface of the projected portion via the gasket, for example, and is attached to an end (upper end) on an opening side of case body 12.

It is preferable that sealing body 13 has a safety valve that brakes when a pressure inside battery case 14 is increased up to a threshold. In the case where a gas is jetted from the safety valve of sealing body 13, the gas is discharged to the outside of battery module 10 through through hole 26 of wiring board 20 and an exhaust duct not shown.

In the present exemplary embodiment, a positive electrode lead connected to the positive electrode is welded to a lower surface (inner surface) of sealing body 13, and a negative electrode lead connected to the negative electrode is welded to an inner surface of a bottom of case body 12. Therefore, sealing body 13 functions as a positive electrode external terminal (first external terminal) and case body 12 functions as a negative electrode external terminal (second external terminal). However, cylindrical battery 11 may be configured such that case body 12 functions as a positive electrode external terminal and sealing body 13 functions as a negative electrode external terminal. In that case, bar-shaped members illustrated in FIG. 1 constitute a negative electrode-side current collector member, and ring-shaped members constitute a positive electrode-side current collector member.

Positive electrode-side current collector member 30 is electrically connected to sealing body 13 that functions as a positive electrode external terminal of cylindrical battery 11. Further, a plurality of positive electrode-side current collector members 30 are electrically connected to positive electrode-side wiring pattern 23 of wiring board 20. That is, by each positive electrode side current collector body 30, sealing body 13 of cylindrical battery 11 and positive electrode-side wiring pattern 23 of wiring board 20 are electrically connected, and by positive electrode-side wiring pattern 23, positive electrodes of cylindrical batteries 11 are connected to each other. Positive electrode-side current collector member 30 is a bar-shaped member that is elastically deformable in the up and down direction, and is urged or energized to sealing body 13 of cylindrical battery 11 in a state where engagement claw 42, described below, of negative electrode-side current collector member 40 engages with groove 15 formed on case body 12. When positive electrode-side current collector member 30 is deflected or deformed in some extent in the up and down direction, a spring force is obtained, whereby sealing body 13 can be pressed. Therefore, fine electrical connection can be secured without welding positive electrode-side current collector member 30 to sealing body 13.

Positive electrode-side current collector member 30 includes base 31, protrusion 32 to be pressed against sealing body 13, and connector 33 to be joined to current collector pad 25, described below, of wiring board 20. Base 31 is formed in an elongated bar-shape having an almost uniform width in a plan view. Protrusion 32 is formed in a center portion in a longitudinal direction of base 31, and connectors 33 are formed on both ends in the longitudinal direction of base 31. For example, protrusion 32 is formed by bending base 31 in an almost V shape, and connector 33 is formed by bending base 31 in an almost L shape. Positive electrode-side current collector member 30 is mounted on wiring board 20 such that a tip of protrusion 32 faces cylindrical battery 11.

Negative electrode-side current collector member 40 is electrically connected to case body 12 that functions as a negative electrode external terminal of cylindrical battery 11. Further, a plurality of negative electrode-side current collector members 40 are electrically connected to negative electrode-side wiring pattern 24 of wiring board 20. That is, by each negative electrode side current collector member 40, case body 12 of each cylindrical battery 11 and negative electrode-side wiring pattern 24 of wiring board 20 are electrically connected to each other, and by negative electrode-side wiring pattern 24, negative electrodes of cylindrical batteries 11 are connected to each other. Negative electrode-side current collector member 40 is a ring-shaped member including annular base 41 in an annular shape, engagement claw 42 that engages with groove 15 formed on case body 12 of cylindrical battery 11, and connecting board 43 to be joined to negative electrode-side wiring pattern 24 of wiring board 20. Engagement claw 42 extends downward from a radially outer end of annular base 41, and a lower end thereof is bent inward. Connecting board 43 protrudes radially outward from the radially outer end of annular base 41.

It is preferable that a plurality of engagement claws 42 and connecting boards 43 are provided. In the present exemplary embodiment, engagement claws 42 and connecting boards 43 are provided alternately in a circumferential direction of annular base 41. They are provided in a same number (six pieces each) in the circumferential direction of annular base 41 at almost equal intervals. However, a number, arrangement, and the like are not limited thereto. A diameter of negative electrode-side current collector member 40 is larger than a diameter of through hole 26 in a portion where connecting board 43 is formed. On the other hand, a diameter of annular base 41 is smaller than the diameter of through hole 26, and annular base 41 and engagement claw 42 can be inserted in through hole 26.

Figure 2:
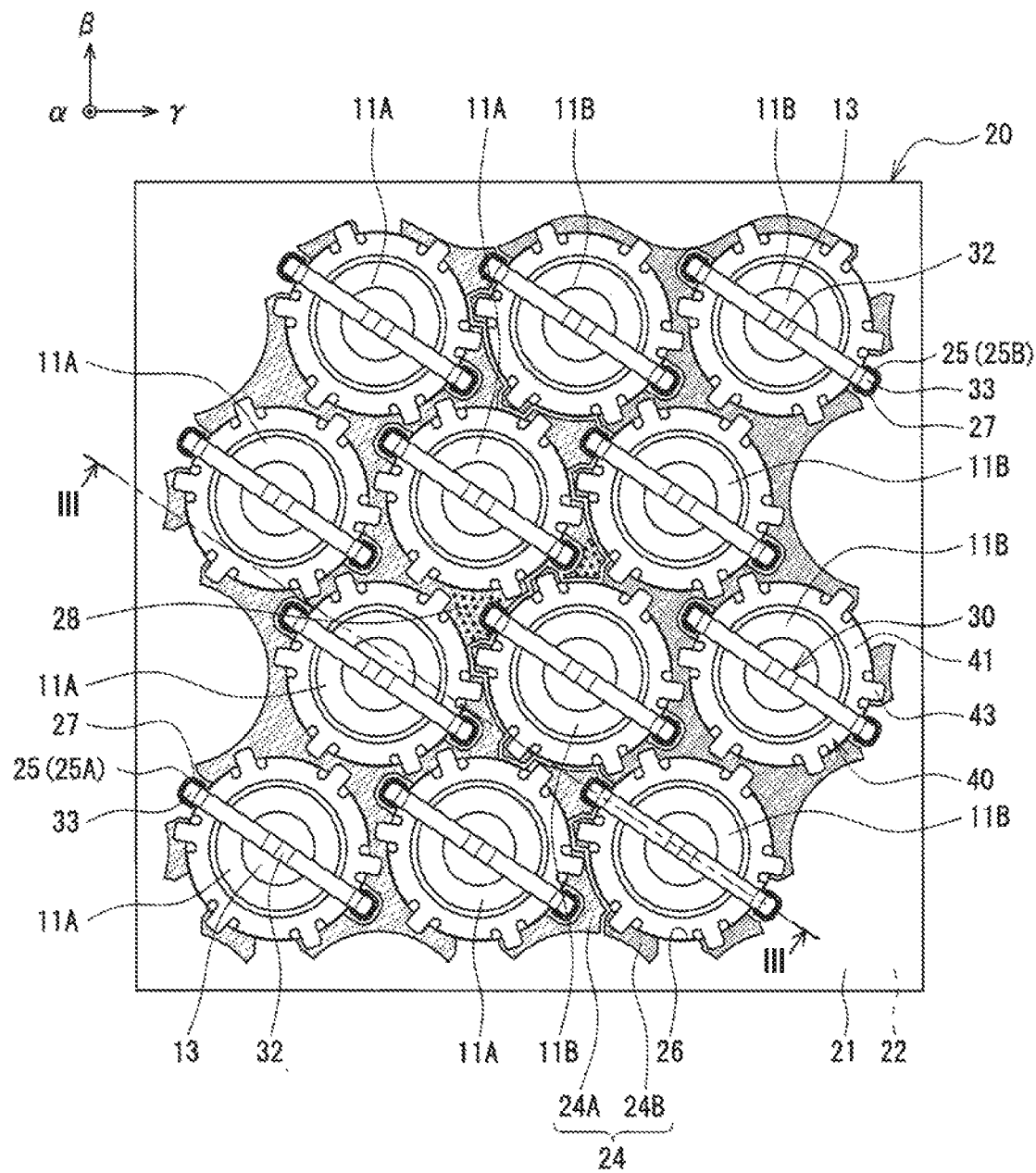
FIG. 2 is a plan view of the battery module according to the first exemplary embodiment.
Figure 3:
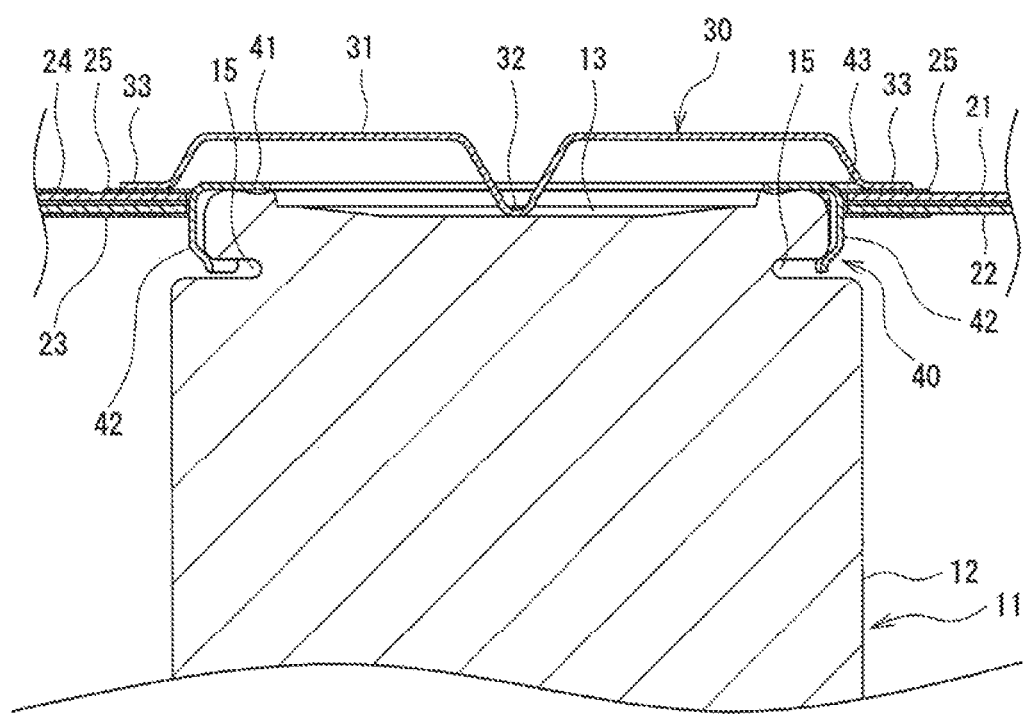
FIG. 3 shows a part of a cross-section taken along line III-III in FIG. 2.
Figure 4:
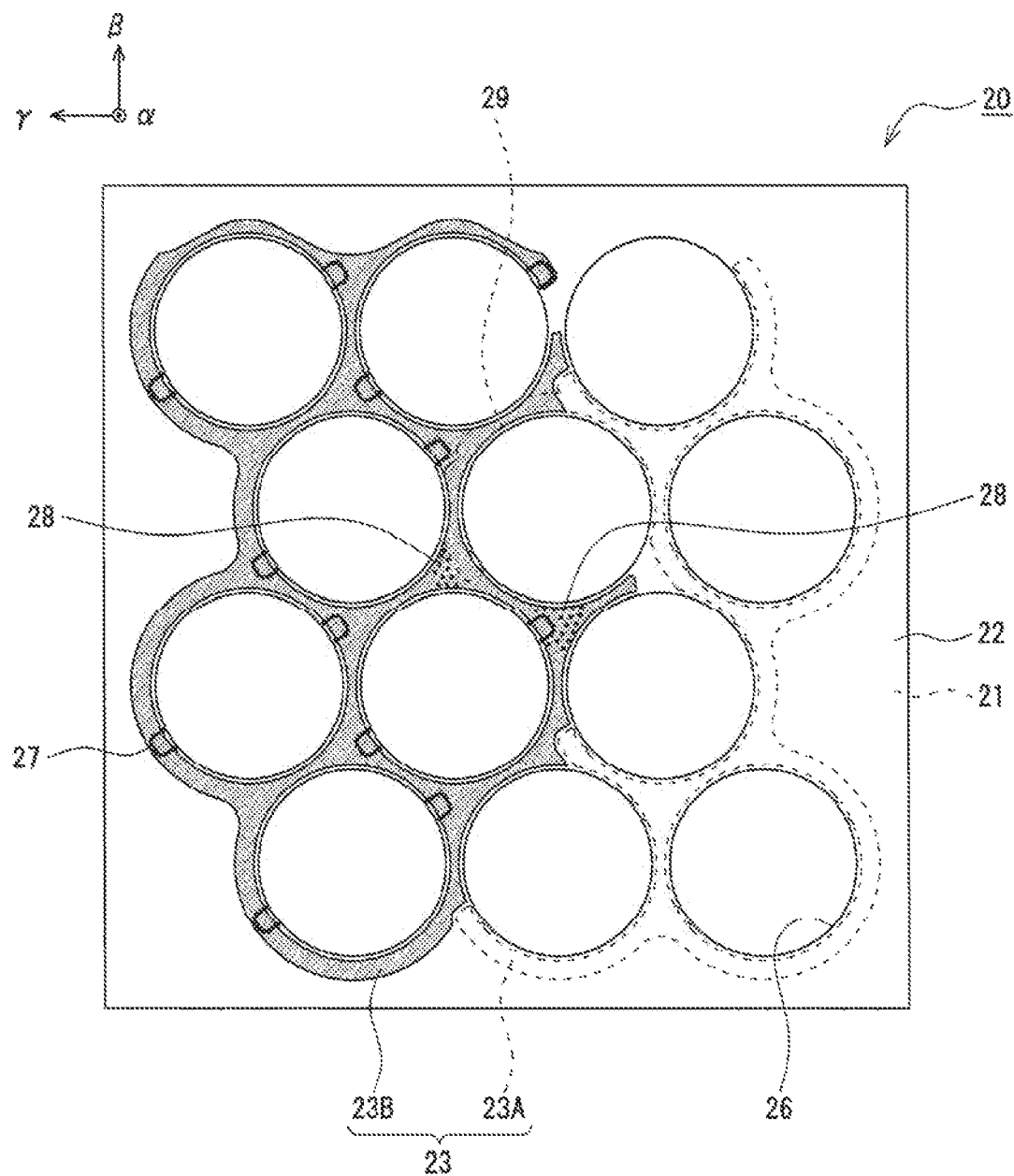
FIG. 4 is a rear view of a wiring board according to the first exemplary embodiment.
Figure 5:
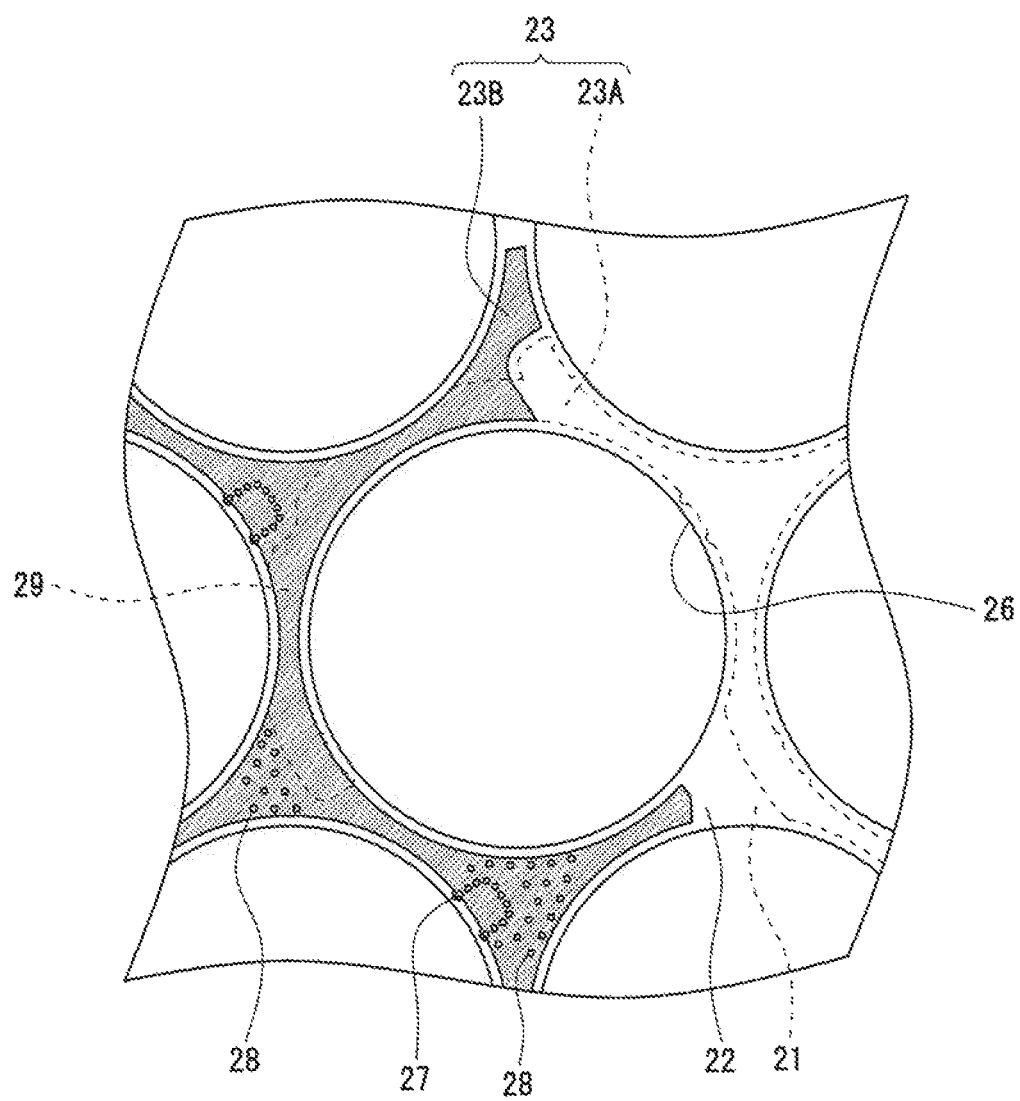
FIG. 5 shows a part of FIG. 4 in an enlarged manner.
Figure 6:
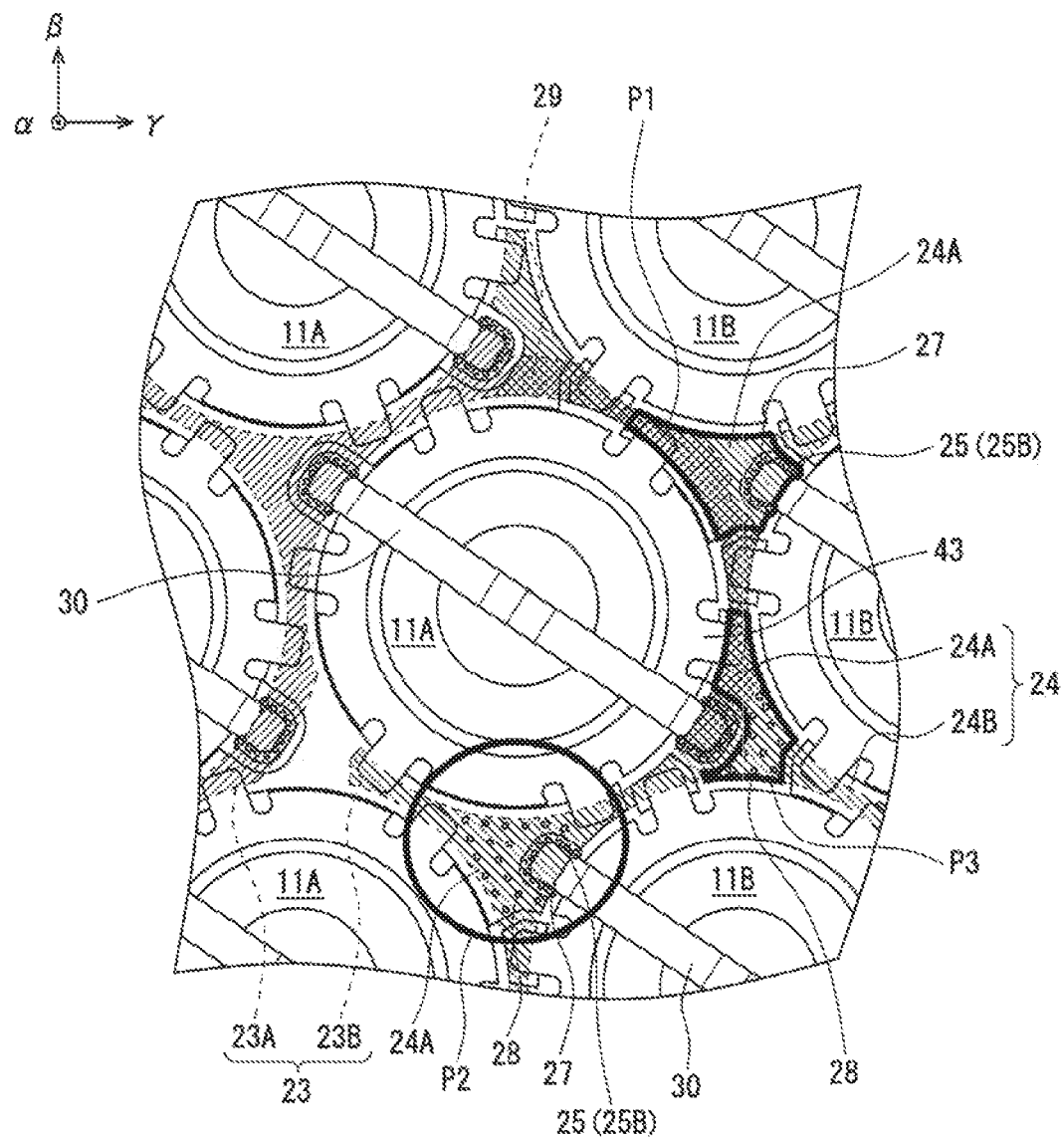
FIG. 6 is a diagram for explaining wiring patterns and a connection form of current collector members.

Wiring patterns of wiring board 20 and connection form between the wiring patterns and current collector members will be described in detail below with reference to FIGS. 2 to 6. FIGS. 2 and 6 are plan views of battery module 10. In FIG. 6, a part of FIG. 2 is enlarged, and positive electrode-side wiring pattern 23 is shown together. FIG. 3 shows a part of a cross-section taken along line III-III FIG. 2. FIG. 4 is a rear view of wiring board 20, and FIG. 5 shows a part of FIG. 4 in an enlarged manner.

As shown in FIGS. 2 and 3, wiring board 20 includes substrate 21 and negative electrode-side wiring pattern 24 formed on an upper surface of substrate 21. Wiring board 20 has an almost square shape in a plan view. However, the shape of wiring board 20 in a plan view is not limited particularly. Negative electrode-side wiring pattern 24 includes first wiring pattern 24A corresponding to the first parallel block A and second wiring pattern 24B corresponding to the second parallel block B. First wiring pattern 24A is a pattern for electrically connecting negative electrodes of six cylindrical batteries 11A, and second wiring pattern 24B is a pattern for electrically connecting negative electrodes of six cylindrical batteries 11B. The patterns are separated electrically.

Negative electrode-side wiring pattern 24 is configured of a metallic material having copper, aluminum, or the like as a main component. Negative electrode-side wiring pattern 24 is formed such that a metal layer is formed on the upper surface of substrate 21 by vapor deposition, sputtering, plating, or the like, and then the metal layer is patterned. Each of positive electrode-side wiring pattern 23, current collector pad 25, and the current collector members is also configured of a metallic material similar to that of negative electrode-side wiring pattern 24.

Wiring board 20 has a substrate 22 layered on a lower surface of substrate 21. Wiring board 20 has a structure in which negative electrode-side wiring pattern 24, substrate 21, first wiring pattern 23A of positive electrode-side wiring pattern 23 (see FIG. 4), substrate 22, and second wiring pattern 23B of positive electrode-side wiring pattern 23 (see FIG. 4) are layered in an order from the top. That is, in wiring board 20, metal layers each constituting a wiring pattern are formed in three layers, and metal layers constituting positive electrode-side wiring pattern 23 are formed separately in two layers. Wiring board 20 is a wiring board having a multilayer structure in which wiring patterns of the positive electrode side and the negative electrode side are formed separately in different layers. Although described below in detail, in the present exemplary embodiment, first wiring pattern 23A and second wiring pattern 23B are overlapped in a thickness direction of wiring board 20. Therefore, substrate 22 is provided to insulate the two wiring patterns.

While substrates 21, 22 may be substrates having insulation property, it is preferable that they are resin substrates from viewpoint of machinability, light weight, and the like. A preferable example of substrates 21, 22 is glass fiber-reinforced plastic containing epoxy resin as a resin component. A thickness of each of substrates 21, 22 ranges from 0.2 mm to 2 mm, for example.

It is preferable that battery module 10 has a plurality of current collector pads 25 that are formed on the upper surface of wiring board 20 and penetrate wiring board 20 to be electrically connected with positive electrode-side wiring pattern 23 formed on the lower surface side of wiring board 20. Each of current collector pads 25 has a plurality of through-hole connectors 27. Current collector pad 25 is electrically connected to positive electrode-side wiring pattern 23 by through-hole connectors 27.

Current collector pads 25 include current collector pad 25A to be connected to first wiring pattern 23A of positive electrode-side wiring pattern 23, and current collector pad 25B to be connected to second wiring pattern 23B of positive electrode-side wiring pattern 23. That is, some through-hole connectors 27 penetrate substrate 21 to connect to first wiring pattern 23A, and remaining through-hole connectors 27 penetrate substrates 21, 22 to connect to second wiring pattern 23B.

To the upper surface of substrate 21, positive electrode-side current collector member 30 and negative electrode-side current collector member 40 are joined. Specifically, connector 33 of positive electrode-side current collector member 30 is joined to current collector pad 25, and connecting board 43 of negative electrode-side current collector member 40 is joined to negative electrode-side wiring pattern 24. As current collector pads 25 are formed, respective current collector members can be joined to a same surface of wiring board 20. Each current collector member is soldered to wiring board 20, for example. However, in battery module 10, soldering is not needed at the time of connecting wiring board 20 with current collector members and each cylindrical battery 11.

Wiring board 20 has a plurality of though holes 26, as described above. Through holes 26 are formed in the same number as the number of cylindrical batteries 11, and serve as gas exhaust paths when gas is jetted from cylindrical battery 11. Further, through hole 26 is formed in a size that each of cylindrical battery 11 and negative electrode-side current collector member 40 can be inserted. An upper end of cylindrical battery 11, annular base 41 of negative electrode-side current collector member 40, and through hole 26 have an almost true circular shape in a plan view, for example, and diameters thereof satisfy a relationship of the upper end of cylindrical battery 11<annular base 41<through hole 26. Cylindrical battery 11 has a shape that the upper end to which negative electrode-side current collector member 40 is attached has a reduced diameter compared with the diameter of the other part.

Twelve pieces of through holes 26 are formed in total, three pieces each in the lateral direction of wiring board 20. While three through holes 26 are laterally aligned in a line, through holes 26 adjacent in the front-back direction are formed in zigzag. Cylindrical batteries 11 are disposed below respective through holes 26 in a state where an upper end thereof, to which negative electrode-side current collector member 40 is to be mounted, is inserted in each through hole 26. That is, cylindrical batteries 11 are arranged in zigzag. By forming cylindrical battery 11 such that only the upper end is small and arranging respective cylindrical batteries 11 in zigzag in a packed manner, it is possible to increase a volume energy density of battery module 10.

Negative electrode-side wiring pattern 24 and current collector pad 25 are formed on peripheries of through holes 26. Positive electrode-side wiring pattern 23 is also formed on peripheries of through holes 26. Then, positive electrode-side current collector member 30 and negative electrode-side current collector member 40 are electrically connected with the corresponding wiring patterns on the peripheries of respective through holes 26.

In wiring board 20, first wiring pattern 24A is formed on one lateral side on the upper surface of substrate 21, and second wiring pattern 24B is formed on another lateral side. Each of first wiring pattern 24A and second wiring pattern 24B has one large pattern continuously formed around the peripheries of six through holes 26. In first wiring pattern 24A and second wiring pattern 24B, some portions such as a portion formed between cylindrical batteries 11A, 11B are formed in a small island shape so as not to be in contact with each other.

Connecting board 43 of each negative electrode-side current collector member 40 is joined to negative electrode-side wiring pattern 24 on the periphery of each through hole 26. Negative electrode-side current collector member 40 is joined to only one of first wiring pattern 24A and second wiring pattern 24B. Positive electrode-side current collector member 30 is also joined to only one of current collector pads 25A, 25B.

Negative electrode-side current collector member 40 is inserted in each through hole 26 in a state where engagement claw 42 faces downward. Engagement claw 42 protruding downward from through hole 26 engages with groove 15 of each case body 12. A lower end of engagement claw 42 is bent inward, and the bent lower end is hooked to groove 15. A plurality of engagement claws 42 are provided in a circumferential direction of annular base 41, so that negative electrode-side current collector member 40 is firmly fixed to case body 12 by engagement claws 42. Therefore, fine electrical connection is obtained between negative electrode-side current collector member 40 and case body 12.

On the periphery of through hole 26, two current collector pads 25 are formed adjacently in a radial direction of through hole 26. Positive electrode-side current collector member 30 is stretched over a center in a radial direction of through hole 26 to both sides of through hole 26, and respective connectors 33 on both ends in a longitudinal direction are joined to two current collector pads 25, respectively. In the present exemplary embodiment, all current collector pads 25A and two current collector pads 25B are formed with a gap with negative electrode-side wiring pattern 24. However, four current collector pads 25B are formed to continue to first wiring pattern 24A of negative electrode-side wiring pattern 24.

While described below in detail, when first wiring pattern 24A and positive electrode-side current collector member 30, joined to current collector pad 25B, are electrically connected to each other, first parallel block A and second parallel block B are connected in series. In wiring board 20, through-hole connector 28 that connects first wiring pattern 24A and second wiring pattern 23B of positive electrode-side wiring pattern 23 is formed.

Positive electrode-side current collector member 30 is provided over negative electrode-side current collector member 40 so as not to be in contact with negative electrode-side current collector member 40. Connector 33 to be joined to current collector pad 25 is formed such that both ends in a longitudinal direction of base 31 are bent downward. Accordingly, a portion away from both ends in the longitudinal direction of base 31 is positioned above connector 33. Therefore, base 31 can be provided over annular base 41 in a state where connector 33 is joined to current collector pad 25.

On the other hand, positive electrode-side current collector member 30 is in contact with sealing body 13 of cylindrical battery 11 in a state where connector 33 is joined to current collector pad 25 and engagement claw 42 of negative electrode-side current collector member 40 engages with groove 15 of cylindrical battery 11. In a center portion of a longitudinal direction of positive electrode-side current collector member 30, protrusion 32 protruding downward from connector 33 is formed. Therefore, protrusion 32 is brought into contact with sealing body 13. As positive electrode-side current collector member 30 is a bar-shaped member that is elastically deformable in the up and down direction, protrusion 32 is strongly pressed against sealing body 13 by a spring force of positive electrode-side current collector member 30. Therefore, fine electrical connection is obtained between positive electrode-side current collector member 30 and sealing body 13.

As shown in FIGS. 4 and 5, wiring board 20 has second wiring pattern 23B corresponding to the second parallel block B of positive electrode-side wiring pattern 23 formed on the lower surface of substrate 22. Wiring board 20 also has first wiring pattern 23A corresponding to the first parallel block A of positive electrode-side wiring pattern 23 formed between substrate 21 and substrate 22. First wiring pattern 23A may be formed on the lower surface of substrate 21 or formed on the upper surface of substrate 22.

First wiring pattern 23A electrically connects positive electrodes of six cylindrical batteries 11A to each other, and second wiring pattern 23B electrically connects positive electrodes of six cylindrical batteries 11B to each other. Each of first wiring pattern 23A and second wiring pattern 23B is formed continuously on peripheries of six through holes 26, not including island-shaped small patters as in negative electrode-side wiring pattern 24.

In the present exemplary embodiment, a part of first wiring pattern 23A and a part of second wiring pattern 23B overlap each other in a thickness direction of wiring board 20. Therefore, in order to secure insulation between first wiring pattern 23A and second wiring pattern 23B, substrate 22 exists between the two patterns. Overlapping portion 29 of first wiring pattern 23A overlapping on second wiring pattern 23B via substrate 22 is formed to secure electric connection with one of connectors 33 of positive electrode-side current collector member 30. Through-hole connector 27 (not shown in FIGS. 4, 5) of current collector pad 25, corresponding to a tip of overlapping portion 29, is formed. Note that second wiring pattern 23B may not have a part overlapping first wiring pattern 23A. In that case, substrate 22 may not be provided.

As described above, wiring board 20 includes first wiring pattern 23A of positive electrode-side wiring pattern 23 and first wiring pattern 24A of negative electrode-side wiring pattern 24, electrically connected to a first battery group A configured of six cylindrical batteries 11A. Also, second wiring pattern 23B of positive electrode-side wiring pattern 23 and second wiring pattern 24B of negative electrode-side wiring pattern 24, electrically connected to a second battery group B configured of six cylindrical batteries 11B, are included.

As illustrated in FIG. 6, in battery module 10, second wiring pattern 23B of positive electrode-side wiring pattern 23 and first wiring pattern 24A of negative electrode-side wiring pattern 24 are electrically connected, thereby the first parallel block A and the second parallel block B are connected in series. For example, at points P1, P2, P3 shown in FIG. 6, second wiring pattern 23B and first wiring pattern 24A are electrically connected. At points P1, P2, current collector pad 25B and first wiring pattern 24A are continuously formed. Then, by through-hole connector 27 formed in current collector pad 25B, second wiring pattern 23B and first wiring pattern 24A are electrically connected.

At point P2, in addition to through-hole connector 27 of current collector pad 25B, a plurality of through-hole connectors 28 for connecting second wiring pattern 23B and first wiring pattern 24A are formed. Further, in first wiring pattern 24A at point P3, a plurality of through-hole connectors 28 for connecting second wiring pattern 23B and first wiring pattern 24A are formed, although positive electrode-side current collector member 30 is not connected. As described above, at a plurality of locations on wiring board 20, the first parallel block A and the second parallel block B are connected in series. Note that the first parallel block A and the second parallel block B may be directly connected through connection between first wiring pattern 23A of positive electrode-side wiring pattern 23 and second wiring pattern 24B of negative electrode-side wiring pattern 24.

Second Exemplary Embodiment

With reference to FIGS. 7 to 11, battery module 50 according to a second exemplary embodiment will be described below in detail. The following description is primarily given on differences from the first exemplary embodiment. Regarding configuration elements similar to those in the first exemplary embodiment, redundant description will be omitted.

Figure 7:
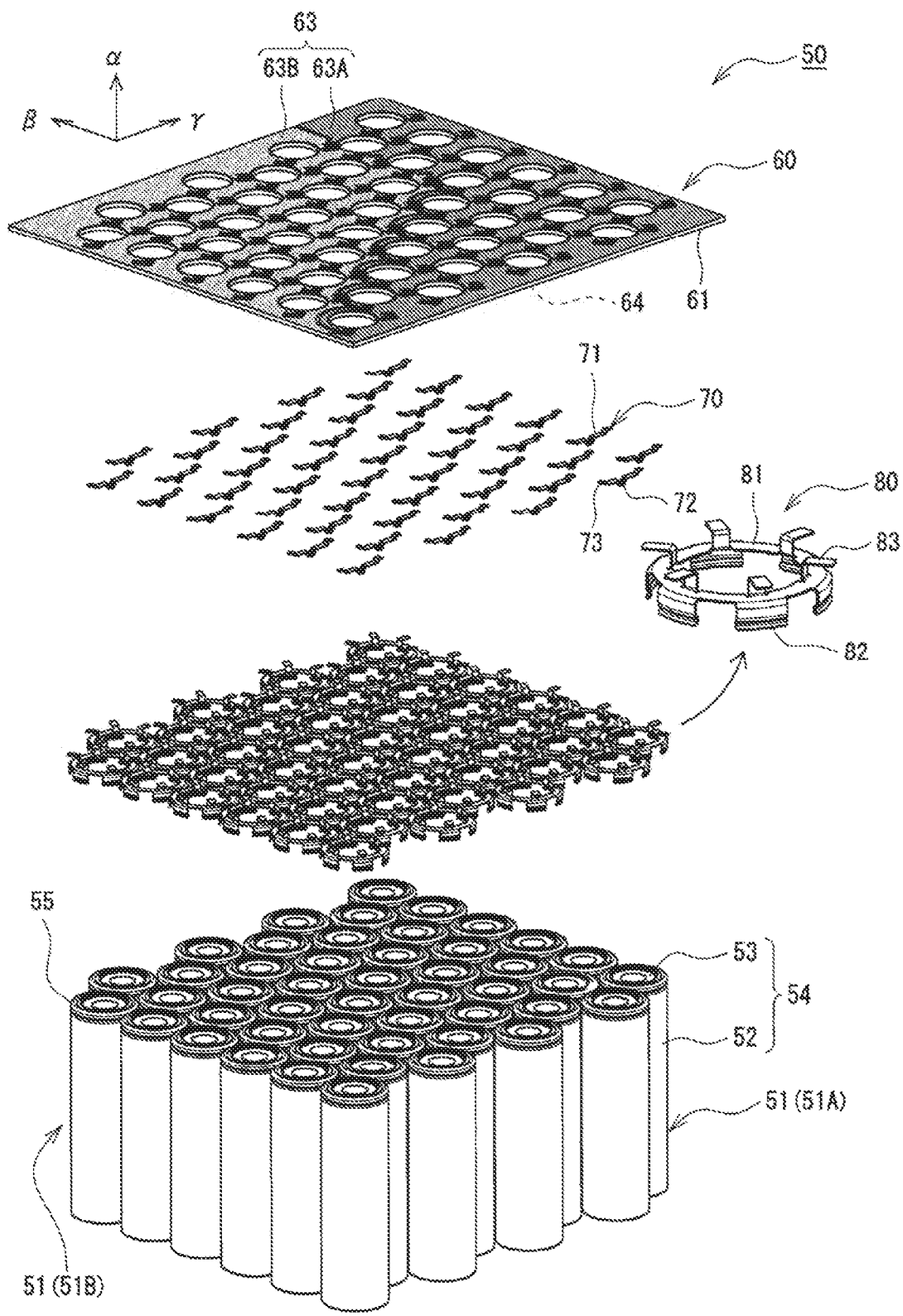
FIG. 7 is an exploded perspective view of a battery module according to a second exemplary embodiment.

FIG. 7 is an exploded perspective view of battery module 50. As illustrated in FIG. 7, battery module 50 includes a plurality of cylindrical batteries 51, a wiring board 60 provided on a side of sealing body 53 so as to cover cylindrical batteries 51, a plurality of positive electrode-side current collector members 70, and a plurality of negative electrode-side current collector members 80. Cylindrical battery 51 has a battery case 54 made of metal configured of case body 52 and sealing body 53. However, it differs from cylindrical battery 11 in that an upper end does not have a reduced diameter. Similar to cylindrical battery 11, cylindrical battery 51 has groove 55 formed on an upper portion of case body 52.

Battery module 50 is common to battery module 10 in that it includes a first parallel block A and a second parallel block B and that the parallel blocks are connected in series. In the present exemplary embodiment, each parallel block is configured of twenty-four pieces of cylindrical batteries 51A, 51B. Even in the present exemplary embodiment, sealing body 53 functions as a positive electrode external terminal and case body 52 functions as a negative electrode external terminal.

Wiring board 60 is common to wiring board 20 in having positive electrode-side wiring pattern 63 including first wiring pattern 63A and second wiring pattern 63B, and having negative electrode-side wiring pattern 64 including first wiring pattern 64A and second wiring pattern 64B. First wiring patterns 63A, 64A are wiring patterns corresponding to the first parallel block A, and second wiring patterns 63B, 64B are wiring patterns corresponding to the second parallel block B.

On the other hand, wiring board 60 differs from wiring board 20 in that positive electrode-side wiring pattern 63 is formed on an upper surface and negative electrode-side wiring pattern 64 is formed on a lower surface. Wiring board 60 has a structure in which positive electrode-side wiring pattern 63, substrate 61, and negative electrode-side wiring pattern 64 are layered in an order from the top. There is no overlapping portion of positive electrode-side wiring pattern 63. In the present exemplary embodiment, a plurality of current collector pads 65 are formed on the lower surface of substrate 61, and positive electrode-side current collector members 70 and negative electrode-side current collector members 80 are joined to the lower surface of wiring board 60.

Positive electrode-side current collector member 70 is a member that electrically connects sealing body 53 of cylindrical battery 51 and positive electrode-side wiring pattern 63 of wiring board 60. Similar to positive electrode-side current collector member 30, positive electrode-side current collector member 70 is a bar-shaped member that is elastically deformable in the up and down direction, and is urged or energized to sealing body 53 in a state where engagement claw 82, described below, of negative electrode-side current collector member 80 engages with groove 55 formed on case body 52. By a spring force of positive electrode-side current collector member 70, the current collector member is strongly pressed against sealing body 53, whereby fine electrical connection is secured.

Positive electrode-side current collector member 70 includes base 71, protrusion 72 to be pressed against sealing body 53, and connector 73 to be joined to current collector pad 65 of wiring board 60. It differs from positive electrode-side current collector member 30 in that connector 73 is formed to be bent upward. Even in this case, positive electrode-side current collector member 70 is mounted on wiring board 60 such that a tip of protrusion 72 faces cylindrical battery 51.

Similar to negative electrode-side current collector member 40, negative electrode-side current collector member 80 is a ring-shaped member that electrically connects case body 12 of cylindrical battery 51 and negative electrode-side wiring pattern 64 of wiring board 60, and includes annular base 81, engagement claw 82, and connecting board 83. On the other hand, connecting board 83 differs from connecting board 43 of negative electrode-side current collector member 40 in that it extends upward from a radially inner end of annular base 81, and is bent radially outward in middle to be formed in an almost L shape. Further, positions where engagement claw 82 and connecting board 83 are formed in annular base 81 are same. They are provided in a same number (six pieces each) in a circumferential direction of annular base 81 at almost equal intervals.

Figure 8:
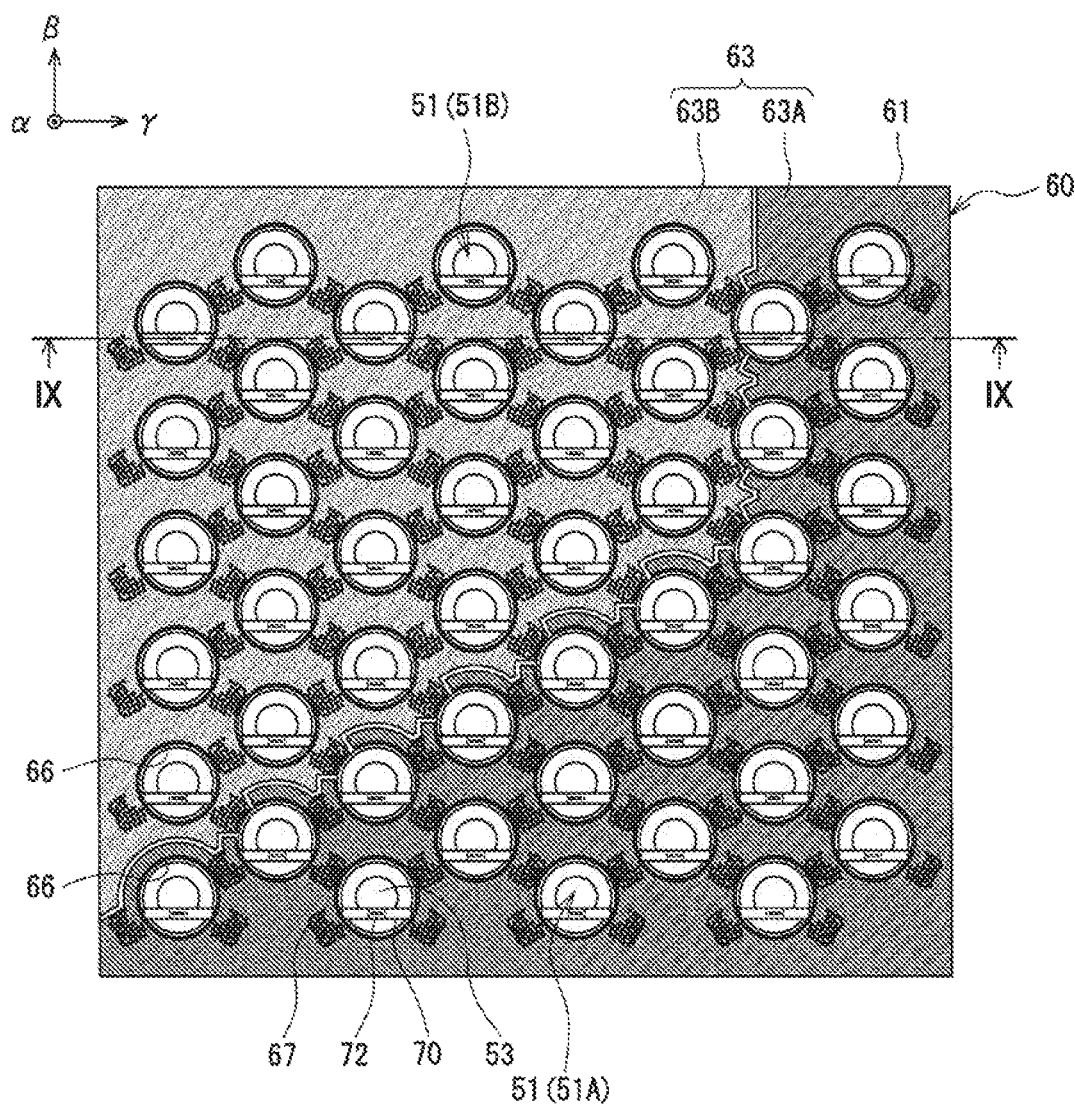
FIG. 8 is a plan view of a wiring board according to the second exemplary embodiment.
Figure 9:
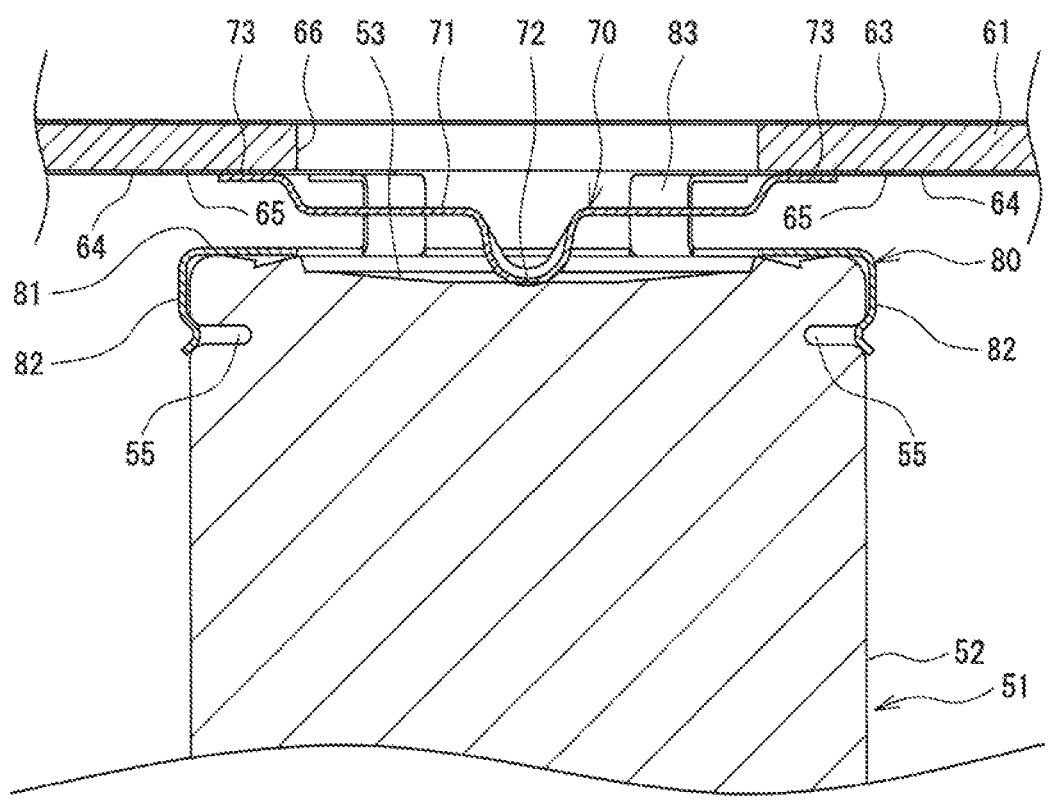
FIG. 9 shows a part of a cross-section taken along line IX-IX in FIG. 8.
Figure 10:
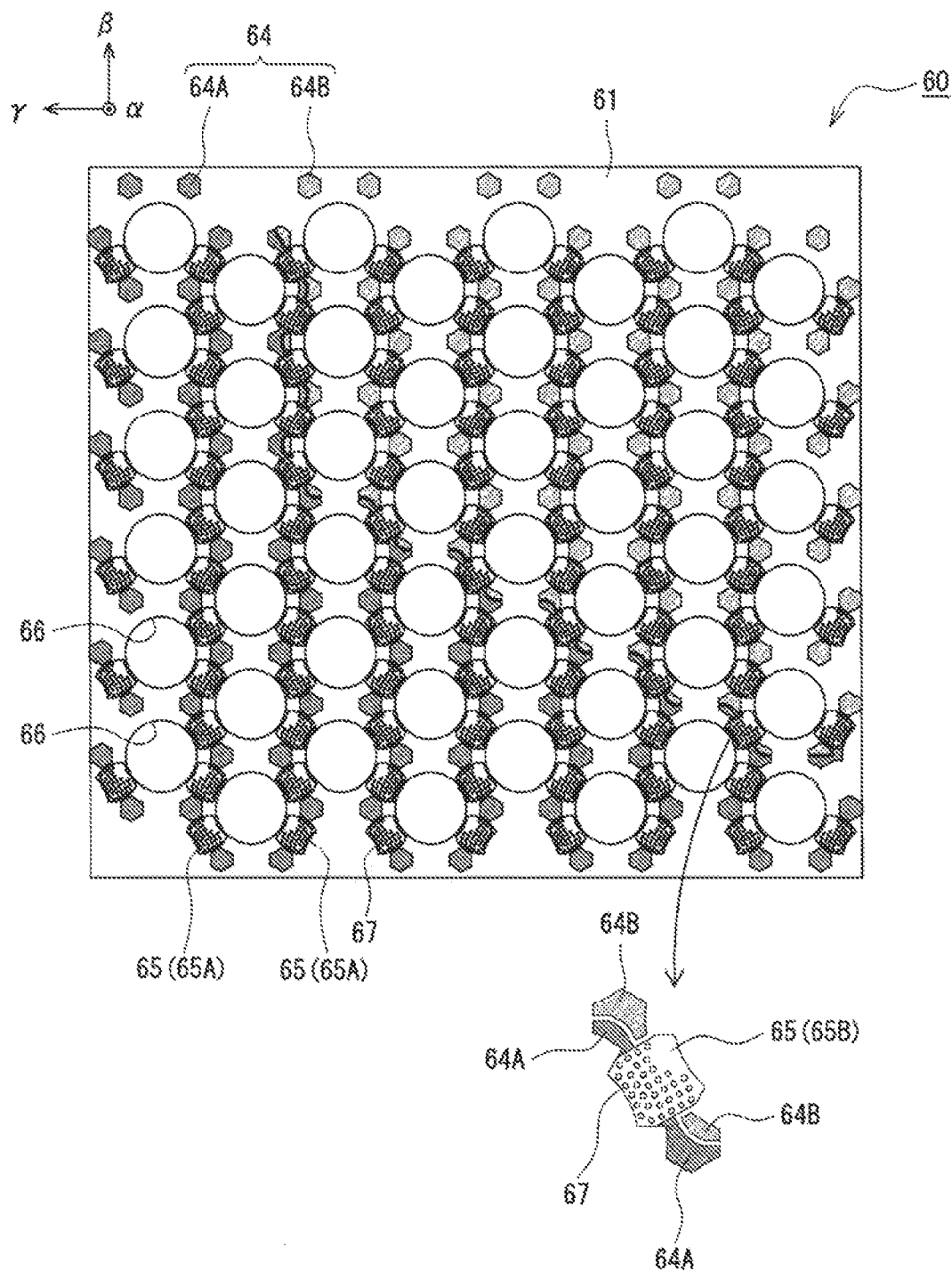
FIG. 10 is a rear view of the wiring board according to the second exemplary embodiment.
Figure 11:
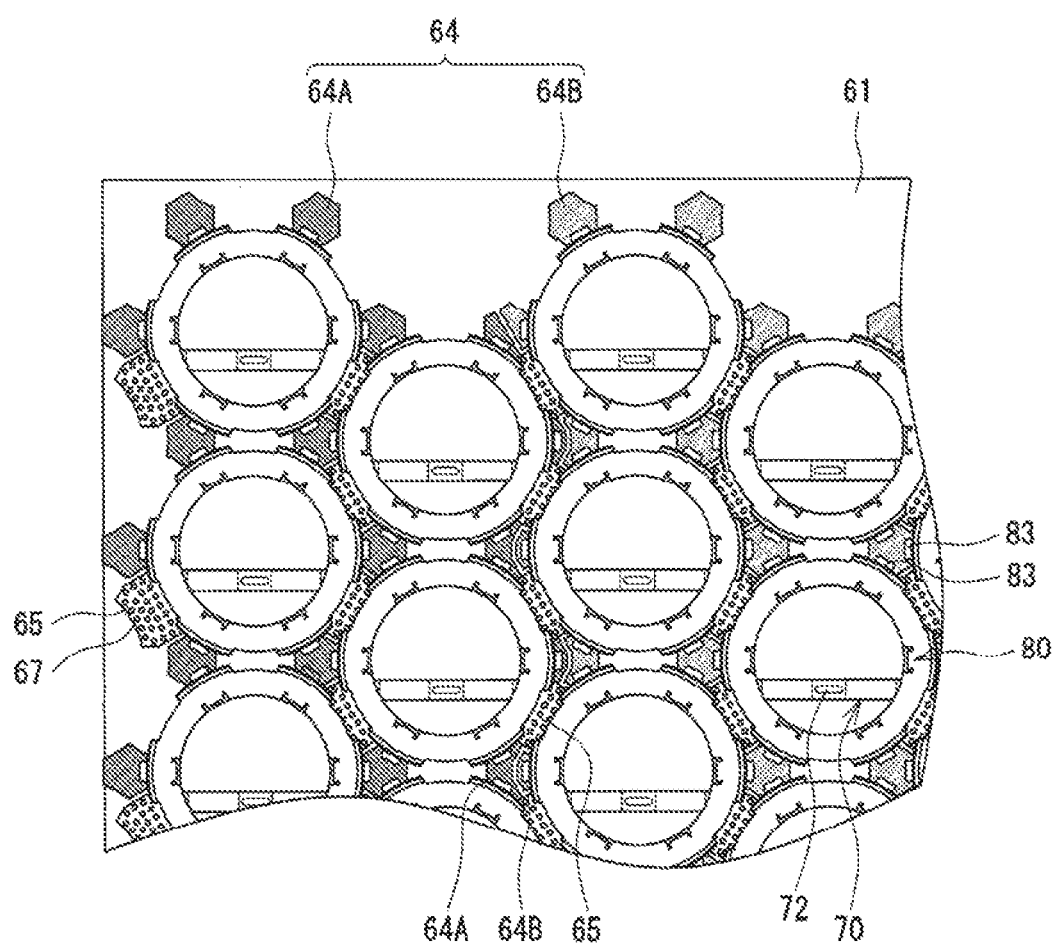
FIG. 11 shows a part of FIG. 10 in an enlarged manner, illustrating a state where a positive electrode-side current collector member and a negative electrode-side current collector member are mounted on a wiring board.

Wiring patterns of wiring board 60 and a connection form between the wiring patterns and current collector members will be further described in detail below with reference to FIGS. 8 to 11. FIG. 8 is a plan view of battery module 50. FIG. 9 shows a part of a cross-section taken along line IX-IX in FIG. 8. FIG. 10 is a rear view of wiring board 20, and FIG. 11 shows a part of FIG. 10 in an enlarged manner, illustrating a state where positive electrode-side current collector member 70 and negative electrode-side current collector member 80 are mounted on wiring board 60.

As illustrated in FIGS. 8 and 9, wiring board 60 includes substrate 61 and positive electrode-side wiring pattern 63 formed on the upper surface of substrate 61. Wiring board 60 has an almost square shape in a plan view. However, the shape of wiring board 60 in a plan view is not limited particularly. Similar to wiring board 20, wiring board 60 has a plurality of through holes 66 for exposing sealing bodies 53 of cylindrical batteries 51. In wiring board 60, forty-eight pieces of through holes 66 in total, six pieces each in a front-back direction, are formed, and through holes 66 adjacent in a lateral direction are formed in zigzag.

Through holes 66 are formed in a number same as a number of cylindrical batteries 51, and serve as gas exhaust paths when gas is jetted from cylindrical battery 51. On the other hand, through hole 66 differs from through hole 26 of wiring board 20 in that cylindrical battery 51 to which negative electrode-side current collector member 80 is attached is not inserted therein. In battery module 50, respective current collector members and cylindrical batteries 51 are arranged only on the lower surface side of wiring board 60.

Positive electrode-side wiring pattern 63 is formed on peripheries of through holes 66. As described above, positive electrode-side wiring pattern 63 includes first wiring pattern 63A and second wiring pattern 63B. Between first wiring pattern 63A and second wiring pattern 63B, a groove-shaped gap is formed, whereby an electrical connection between the two patterns is interrupted. It is preferable that the groove-shaped gap separating the two patterns is formed such that the number of through holes 66 becomes the same on the both sides. Note that the shape of the two patterns in a plan view is not limited particularly.

In positive electrode-side wiring pattern 63, a plurality of through-hole connectors 67 are formed on the periphery of each through hole 66. Through-hole connector 67 is formed on current collector pad 65 to which positive electrode-side current collector member 70 is joined, and penetrates substrate 61 to electrically connect current collector pad 65 and positive electrode-side wiring pattern 63. In the peripheries of many through holes 66, groups of through-hole connectors 67 are formed at four locations. However, in the peripheries of some through holes 66, groups of through-hole connectors 67 are formed at two or three locations. Note that a number of groups of through-hole connectors 67 is same as a number of current collector pads 65.

As shown in FIG. 9, connecting board 83 of negative electrode-side current collector member 80 is joined to negative electrode-side wiring pattern 64 in the periphery of through hole 66. A lower end of engagement claw 82 of negative electrode-side current collector member 80 protrudes inward, and the protruding lower end is hooked to groove 55. A plurality of engagement claws 82 are provided in a circumferential direction of annular base 81, so that negative electrode-side current collector member 80 is firmly fixed to case body 52 by engagement claws 82.

Connector 73 of positive electrode-side current collector member 70 is joined to two current collector pads 65 in the periphery of through hole 66. In the present exemplary embodiment, as connecting board 83 of negative electrode-side current collector member 80 extends upward, a gap in which positive electrode-side current collector member 70 can be inserted is formed between annular base 81 and the lower surface of wiring board 60. Therefore, positive electrode-side current collector member 70 is connected to current collector pad 65 over annular base 81 without being in contact with negative electrode-side current collector member 80. Further, protrusion 72 of positive electrode-side current collector member 70 is in contact with sealing body 53 of cylindrical battery 51. As positive electrode-side current collector member 70 is a bar-shaped member that is elastically deformable in the up and down direction, protrusion 72 is strongly pressed against sealing body 53 by the spring force of positive electrode-side current collector member 70.

As shown in FIGS. 10 and 11, on the lower surface of substrate 61, a plurality of negative electrode-side wiring patterns 64 and a plurality of current collector pads 65 are formed. Negative electrode-side wiring pattern 64 and current collector pad 65 are formed in the periphery of through holes 66. Six negative electrode-side wiring patterns 64 are formed around each through hole 66. To six negative electrode-side wiring patterns 64, connecting boards 83 of negative electrode-side current collector member 80 are joined, respectively. Around each through hole 66, two to four pieces of current collector pads 65 are formed. To two current collector pads 65, connectors 73 of positive electrode-side current collector member 70 are joined, respectively.

Note that two current collector pads 65 to which positive electrode-side current collector member 70 is joined are not aligned in a radial direction of though hole 66 but are formed to be biased to one side of the periphery of through hole 66. Therefore, positive electrode-side current collector member 70 does not pass through center in the radial direction of through hole 66 in a plan view (rear view).

In battery module 50, negative electrode-side current collector members 80, connected to cylindrical batteries 51 constituting a same parallel block, share one negative electrode-side wiring pattern 64. To one negative electrode-side wiring pattern 64, connecting boards 83 of three negative electrode-side current collector members 80 are joined at maximum. Negative electrode-side wiring pattern 64 formed at a boundary position between parallel blocks is separated into two island shapes by a groove-shaped gap. One of them is first wiring pattern 64A, and the other is second wiring pattern 64B.

Positive electrode-side current collector member 70 is joined to only one of current collector pads 65A, 65B. Negative electrode-side current collector member 40 is also joined to only one of first wiring pattern 64A and second wiring pattern 64B. Even in battery module 50, as second wiring pattern 63B of positive electrode-side wiring pattern 63 and first wiring pattern 64A of negative electrode-side wiring pattern 64 are electrically connected, the first parallel block A and the second parallel block B are connected in series.

Specifically, current collector pad 65 to which positive electrode-side current collector member 70 connected to cylindrical battery 51B is joined and first wiring pattern 64A of negative electrode-side wiring pattern 64 are formed continuously. Then, by through-hole connector 67 formed in current collector pad 65, second wiring pattern 63B and first wiring pattern 64A are electrically connected. Series connectors of the first parallel block A and the second parallel block B are provided at a plurality of locations on wiring board 60.

REFERENCE MARKS IN THE DRAWINGS 10, 50 battery module
11, 51 cylindrical battery
12, 52 case body
13, 53 sealing body
14, 54 battery case
15 groove
20, 60 wiring board
21, 22, 61 substrate
23, 63 positive electrode-side wiring pattern
23A, 24A, 63A, 64A first wiring pattern
23B, 24B, 63B, 64B second wiring pattern
24, 64 negative electrode-side wiring pattern
25, 65 current collector pad
26, 66 through hole
27, 28, 67 through-hole connector
30, 70 positive electrode-side current collector member
31, 71 base
32, 72 protrusion
33, 73 connector
40, 80 negative electrode-side current collector member
41, 81 annular base
42, 82 engagement claw
43, 83 connecting board

The invention claimed is:

1. A battery module having a plurality of cylindrical batteries, each of the plurality of cylindrical batteries having a battery case including a case body and a sealing body, the case body having a bottomed cylindrical shape and containing a power generation element, the sealing body sealing an opening of the case body, the plurality of cylindrical batteries being disposed in a state where a plurality of the sealing bodies face in a same direction,
the battery module comprising:
a wiring board provided to a side of the sealing body so as to cover the plurality of cylindrical batteries, the wiring board having wiring patterns in a plurality of layers;
a plurality of first current collector members electrically connected to the plurality of the sealing bodies, respectively, the plurality of the sealing bodies functioning as first external terminals of the plurality of cylindrical batteries;
a plurality of second current collector members electrically connected to a plurality of the case bodies, respectively, the plurality of the case bodies functioning as second external terminals of the plurality of cylindrical batteries;
a one-side wiring pattern of the wiring board, the one-side wiring pattern electrically connecting the plurality of first current collector members to each other; and
an other-side wiring pattern of the wiring board, the other-side wiring pattern electrically connecting the plurality of second current collector members to each other,
wherein
the one-side wiring pattern and the other-side wiring pattern are provided on different layers of the wiring board.

2. The battery module according to claim 1, wherein
each of the plurality of cylindrical batteries includes a recess formed on the case body, and
each of the plurality of second current collector members is a ring-shaped member including an engagement claw that engages with the recess, and a connecting board to be joined to the other-side wiring pattern.

3. The battery module according to claim 2, wherein each of the plurality of first current collector members is elastically deformable in an axial direction of the plurality of cylindrical batteries, and in a state where a plurality of the engagement claws of the plurality of second current collector members engage with a plurality of the recesses of the plurality of cylindrical batteries, respectively, the plurality of first current collector members are urged to the plurality of the sealing bodies, respectively.

4. The battery module according to claim 1, further comprising a plurality of current collector pads formed on a layer on which the other-side wiring pattern of the wiring board is formed, the plurality of current collector pads penetrating the wiring board and being electrically connected to the one-side wiring pattern, wherein
on the layer on which the other-side wiring pattern of the wiring board is formed, the plurality of first current collector members are joined to the plurality of current collector pads, respectively, and the plurality of second current collector members are joined to the other-side wiring pattern.

5. The battery module according to claim 1, wherein
the plurality of cylindrical batteries are classified into a first parallel block A and a second parallel block B,
the one-side wiring pattern includes a one-side first wiring pattern and a one-side second wiring pattern, the one-side first wiring pattern being electrically connected to a first battery group constituting the first parallel block among the plurality of cylindrical batteries, the one-side second wiring pattern being electrically connected to a second battery group constituting the second parallel block, and
the other-side wiring pattern includes an other-side first wiring pattern electrically connected to the first battery group, and an other-side second wiring pattern electrically connected to the second battery group.

6. The battery module according to claim 5, wherein the one-side first wiring pattern and the other-side second wiring pattern are electrically connected to each other.

7. The battery module according to claim 1, wherein
the wiring board has a plurality of through holes for exposing the plurality of the sealing bodies of the plurality of cylindrical batteries, respectively, and
the one-side wiring pattern and the other-side wiring pattern are formed on peripheries of the plurality of through holes.

8. The battery module according to claim 7, wherein
the plurality of through holes are formed in a size that the plurality of cylindrical batteries and the plurality of second current collector members can be inserted, respectively, and
the plurality of second current collector members are electrically connected to the case body and the other-side wiring pattern in a state of being inserted in the plurality of through holes, respectively.

\* \* \* \* \*